United States Patent
Aoyama et al.

(10) Patent No.: US 11,774,659 B1
(45) Date of Patent: Oct. 3, 2023

(54) DISPLAY DEVICE AND IMAGE FORMING APPARATUS

(71) Applicants: Jumpei Aoyama, Kanagawa (JP); Satoshi Odanaka, Kanagawa (JP); Reo Kojima, Kanagawa (JP)

(72) Inventors: Jumpei Aoyama, Kanagawa (JP); Satoshi Odanaka, Kanagawa (JP); Reo Kojima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/114,992

(22) Filed: Feb. 28, 2023

(30) Foreign Application Priority Data

Mar. 9, 2022 (JP) .................................. 2022-036337

(51) Int. Cl.
*F21V 8/00* (2006.01)

(52) U.S. Cl.
CPC .................................... *G02B 6/003* (2013.01)

(58) Field of Classification Search
CPC ....... G02B 6/003; G02B 6/006; G02B 6/0066
See application file for complete search history.

(56) References Cited

U.S. PATENT DOCUMENTS

| | | |
|---|---|---|
| 2014/0210157 A1 | 7/2014 | Aoyama |
| 2015/0132039 A1 | 5/2015 | Tobinaga et al. |
| 2015/0132040 A1 | 5/2015 | Aoyama et al. |
| 2015/0212471 A1 | 7/2015 | Aoyama |
| 2015/0251864 A1 | 9/2015 | Aoyama et al. |
| 2015/0253715 A1 | 9/2015 | Tobinaga et al. |
| 2015/0321863 A1 | 11/2015 | Aoyama |
| 2016/0334748 A1 | 11/2016 | Aoyama et al. |
| 2017/0115618 A1 | 4/2017 | Tobinaga et al. |
| 2017/0227911 A1 | 8/2017 | Kuno et al. |
| 2018/0127223 A1 | 5/2018 | Horita et al. |
| 2018/0182213 A1 * | 6/2018 | Osumi ................... G08B 7/066 |
| 2019/0018353 A1 | 1/2019 | Tomita et al. |
| 2019/0039842 A1 | 2/2019 | Aoyama et al. |
| 2019/0225438 A1 | 7/2019 | Aoyama et al. |
| 2019/0243296 A1 | 8/2019 | Shiga et al. |
| 2020/0102168 A1 | 4/2020 | Horita et al. |
| 2020/0290829 A1 | 9/2020 | Aoyama et al. |

(Continued)

FOREIGN PATENT DOCUMENTS

| | | |
|---|---|---|
| JP | 11-041366 | 2/1999 |
| JP | 2006-103947 | 4/2006 |
| JP | 2016-051818 | 4/2016 |

*Primary Examiner* — Mary Ellen Bowman
(74) *Attorney, Agent, or Firm* — XSENSUS LLP (57) ABSTRACT

A display device includes an operation screen attached to an apparatus to accept instructions for the apparatus, display lamps each including a light emitter to provide notification of a state of the apparatus, a light source to emit light, a substrate on which the light source is mounted, a lens that makes up the light emitter of each one of the display lamps, a light guide to guide the light emitted from the light source to the lens, and a housing that covers the substrate. In the display device, the housing has an opening at which the lens is exposed, at an area including a corner formed by an edge of a top face on which the operation screen is disposed and a side face. In the display device, the lens and the light guide is coupled to each other at a coupling surface, and the coupling surface is orthogonal.

9 Claims, 6 Drawing Sheets

(56) References Cited

U.S. PATENT DOCUMENTS

2021/0179373 A1 6/2021 Aoyama et al.
2021/0283928 A1 9/2021 Aoyama
2021/0370678 A1 12/2021 Aoyama et al.

* cited by examiner

DISPLAY DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-036337, filed on Mar. 9, 2022, in the Japan Patent Office, the entire disclosure of which is hereby incorporated by reference herein.

BACKGROUND

Technical Field

Embodiments of the present disclosure relate to a display device and an image forming apparatus.

Background Art

In the related art, apparatuses with an image processing function such as multifunction peripherals (MFP) or laser-beam printers (LP) are provided with a display device such as an operation panel with touch panel function. Through such a display device, a user can select or operate the processing function or setting menu of the apparatuses.

Typically, such a display device is provided with, for example, a plurality of display lamps used to provide notification to a user when a document has been received through facsimile (FAX) or when various kinds of troubles or errors such as the end of toner end or jamming have occurred.

SUMMARY

Embodiments of the present disclosure described herein provide a display device that includes an operation screen attached to an apparatus to accept instructions for the apparatus, a plurality of display lamps each including a light emitter to provide notification of a state of the apparatus, a light source to emit light, a substrate on which the light source is mounted, a lens that makes up the light emitter of each one of the plurality of display lamps, a light guide to guide the light emitted from the light source to the lens, and a housing that covers the substrate. In the display device, the housing has an opening at which the lens is exposed, at an area including a corner formed by an edge of a top face on which the operation screen is disposed and a side face. In the display device, the lens and the light guide is coupled to each other at a coupling surface, and the coupling surface is orthogonal to a direction of travel of the light guided by the light guide.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A display device and an image forming apparatus 1 according to an embodiment of the present disclosure are described below with reference to the drawings. Embodiments of the present disclosure are described below, but the present disclosure is not limited to those embodiments and various applications and modifications may be made without departing from the scope of the disclosure.

Figure 1:
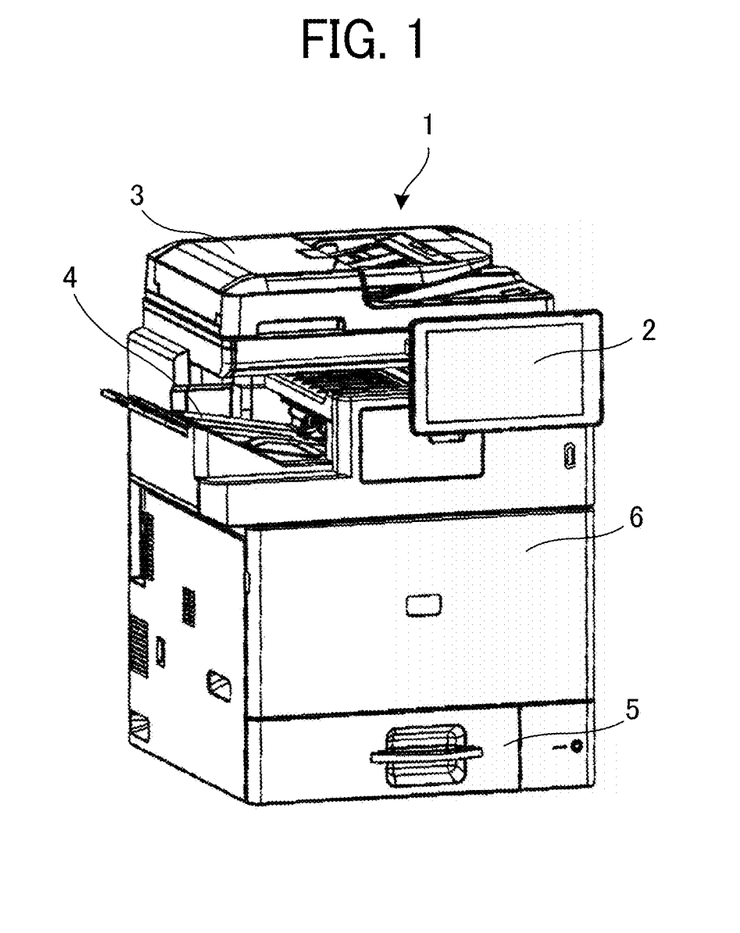
FIG. 1 is a diagram illustrating an external appearance of an image forming apparatus according to an embodiment of the present disclosure.

FIG. 1 is a diagram illustrating an external appearance of the image forming apparatus 1 according to the present disclosure.

The image forming apparatus 1 according to the present embodiment is a multifunction peripheral (MFP) having the functions of, for example, a printer, a facsimile (FAX) machine, and a photocopier. However, the image forming apparatus 1 may have only one of the above functions or may have any combination of the above multiple functions.

The image forming apparatus 1 according to the present embodiment is provided with an operation panel 2 that serves as a display device, an automatic document feeder (ADF) 3 that feeds a document, a recording medium feed tray 5 that stores a plurality of new recording media stacked on top of each other, an image forming device 6 that records an image on a recording medium, and a recording medium output tray 4 to which a recording medium on which an image has been recorded is ejected. Those elements of the image forming apparatus 1 according to the present embodiment will be described later in detail.

The image forming method or system of the image forming apparatus 1 according to the present embodiment is not limited to any specific method or system, and for example, electrophotography or ink-jet printing may be adopted.

In the image forming apparatus 1 that adopts electrophotography, the image forming device 6 includes, for example, an image bearer, a transfer device, and a fixing device. When an image-forming or printing operation is started, a sheet that serves as a recording medium is fed from the recording medium feed tray 5 to the image forming device 6. An image is transferred from image data of a print job to an image bearer in an image forming process, and the image is transferred from the image bearer to a sheet conveyed along a conveyance path. Then, the sheet to which the image has been transferred is carried to the fixing device, and the toner of the image on the sheet is fixed by the fixing device. Finally, the sheet is ejected to the recording medium output tray 4.

Figure 2A:
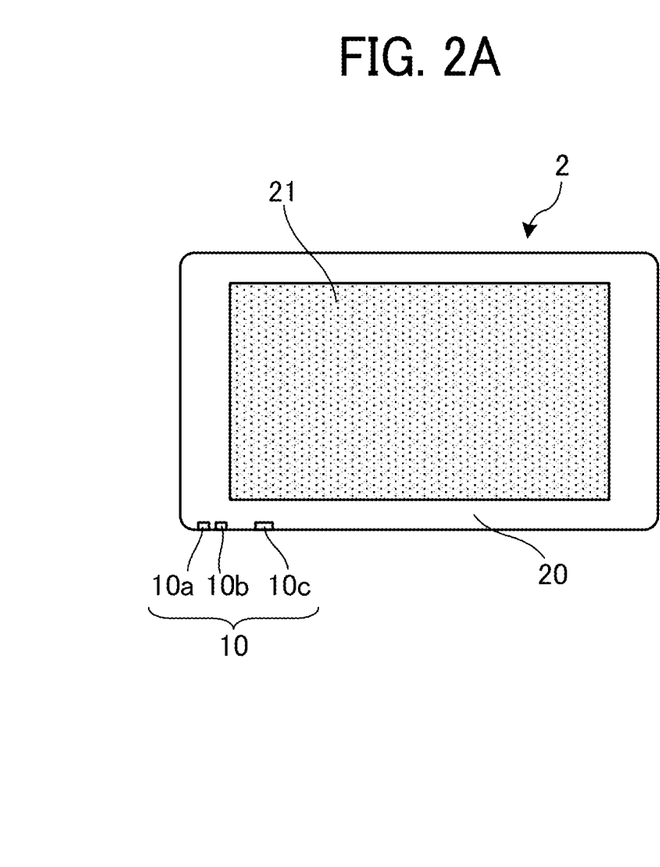
FIG. 2A and FIG. 2B are schematic external views of a display device according to an embodiment of the present disclosure.
Figure 2B:
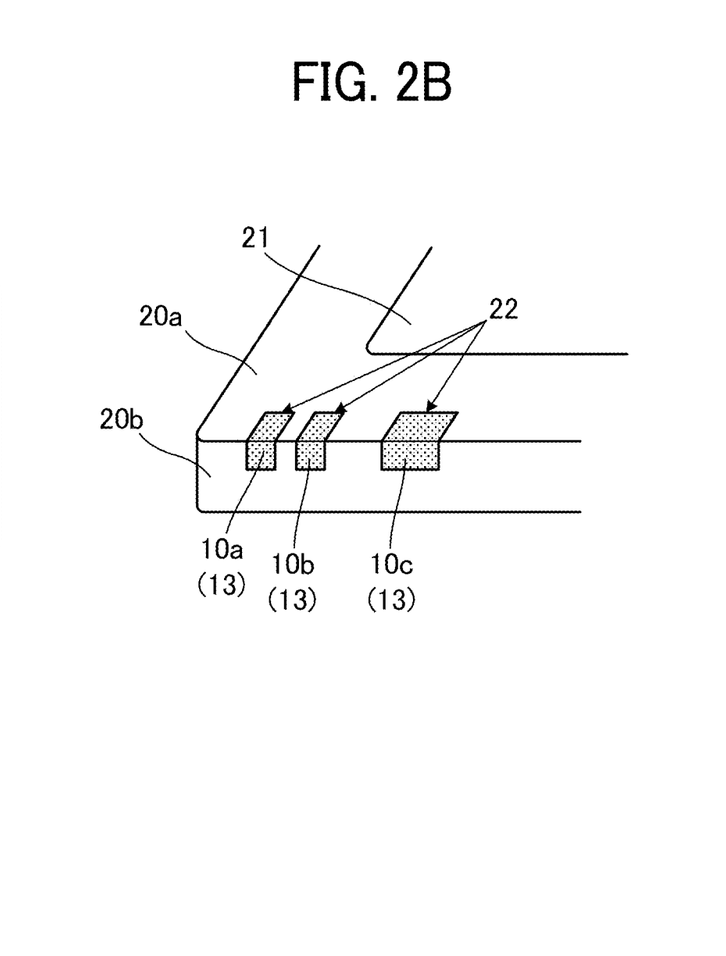

FIG. 2A and FIG. 2B are schematic external views of the operation panel 2 that serves as a display device, according to the present embodiment.

FIG. 2A is a top view of the operation panel 2 according to the present embodiment.

FIG. 2B is a schematic perspective view of the operation panel 2 according to the present embodiment.

Figure 3:
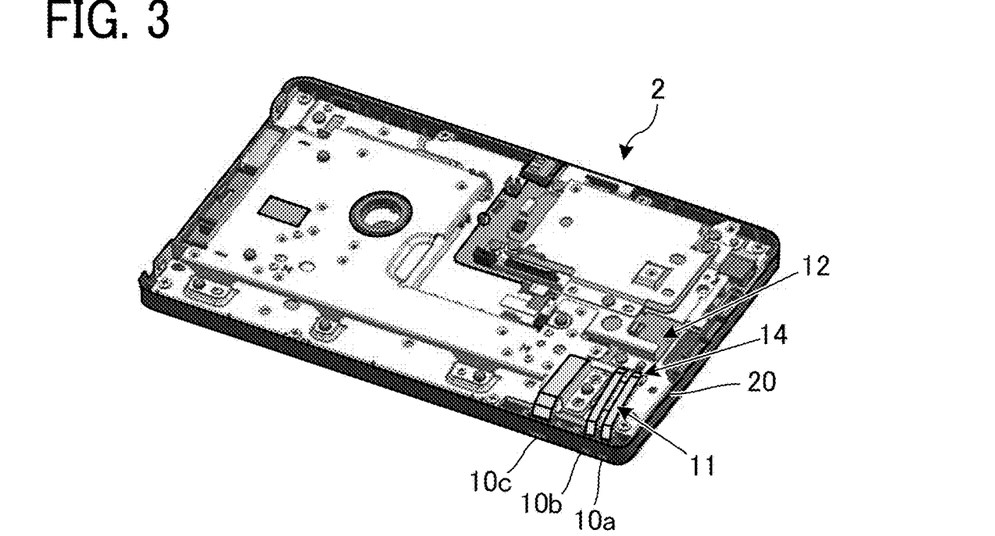
FIG. 3 is a schematic rear view of the inside of a display device according to an embodiment of the present disclosure.

FIG. 3 is a schematic rear view of the inside of the housing 20 of the operation panel 2, according to the present embodiment.

Figure 4:
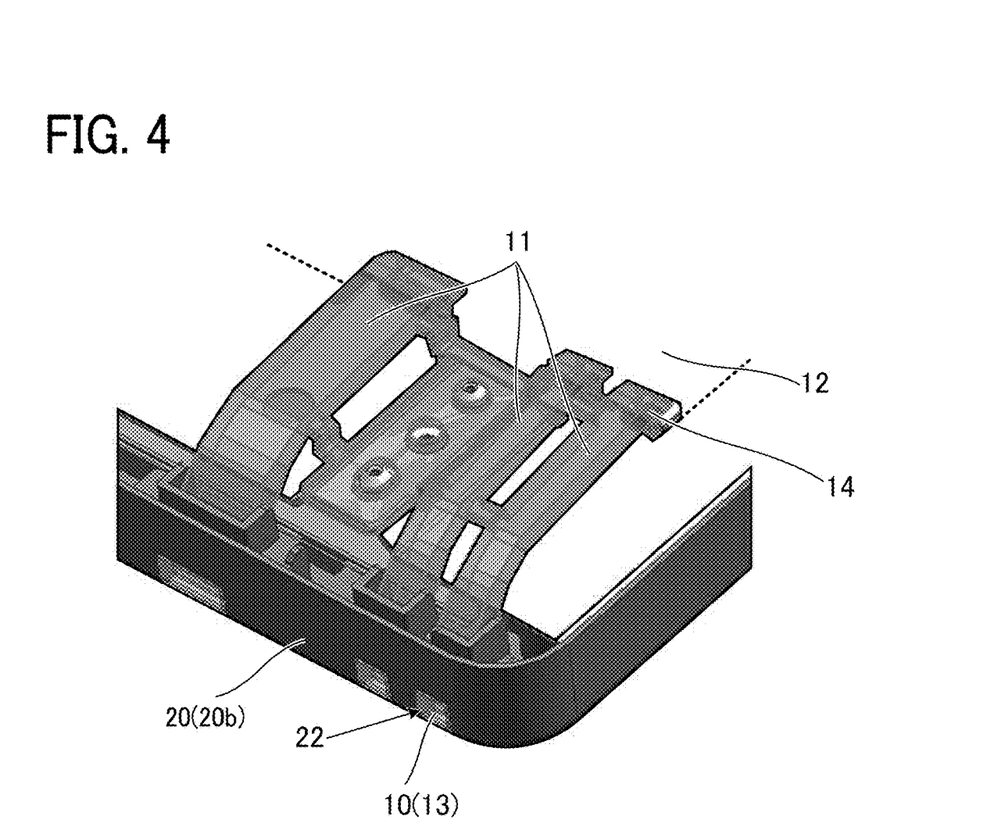
FIG. 4 is a schematic enlarged view of the inside of the display device illustrated in FIG. 3, according to an embodiment of the present disclosure.

FIG. 4 is a schematic magnified view of the inside of the housing 20 of the operation panel 2 as illustrated in FIG. 3, according to the present embodiment.

The operation panel 2 according to the present embodiment that serves as a display device as will be described later is attached to an apparatus such as the image forming apparatus 1 as illustrated in FIG. 1, and is provided with an operation screen 21 that receives the instructions to operate the apparatus, and a plurality of display lamps 10 that provide notification of the status or state of the apparatus. The operation screen 21 according to the present embodiment is, for example, a liquid crystal display (LCD) that serves as a touch panel.

The operation panel 2 according to the present embodiment includes a light source 14 that emits light, a substrate 12 on which the light source 14 is mounted, a housing 20 that covers the substrate 12, a lens 13 that makes up a light emitter of the display lamp 10, and a light guide 11 that guides the light emitted from the light source 14 to the lens 13.

The light source 14 according to the present embodiment is a point source of light, and may be, for example, a light-emitting diode (LED).

The light guide 11 totally reflects the light inwardly emitted from the light source 14, and guides the light in an arranged direction. As a result, the light exits to the outside through an exit plane 11a of the light guide 11 as will be described later in detail. The light guide 11 may be, for example, a light pipe.

The housing 20 of the operation panel 2 has an opening 22 at which the lens 13 of the display lamp 10 is exposed, at an area including the corner formed by an edge of a top face 20a on which the operation screen 21 is arranged and a side face 20b that is continuous to the top face 20a.

As illustrated in FIG. 2B, the multiple display lamps 10 according to the present embodiment are arranged in an area between the edge of the top face 20a of the housing 20 and the side face 20b of the housing 20, and is a member used to provide notification to a user by, for example, turning on the light source 14 or making the light source 14 blink.

In the present embodiment, three display lamps 10a, 10b, and 10c that serve as the display lamp 10 are arranged. However, the number of display lamps 10 to be arranged is not limited to any particular number, and any desired number can be selected.

In the present embodiment described with reference to FIG. 2A and FIG. 2B, the three display lamps 10 include the display lamp 10a that provides notification that a document has been received through facsimile (FAX), the display lamp 10b that provides notification that other kinds of data have been received, and the display lamp 10c that provides notification that an alert was raised to prompt a user to check the state or conditions of the apparatus or various kinds of abnormalities or error such as the end of toner end or jamming have occurred.

Figure 5:
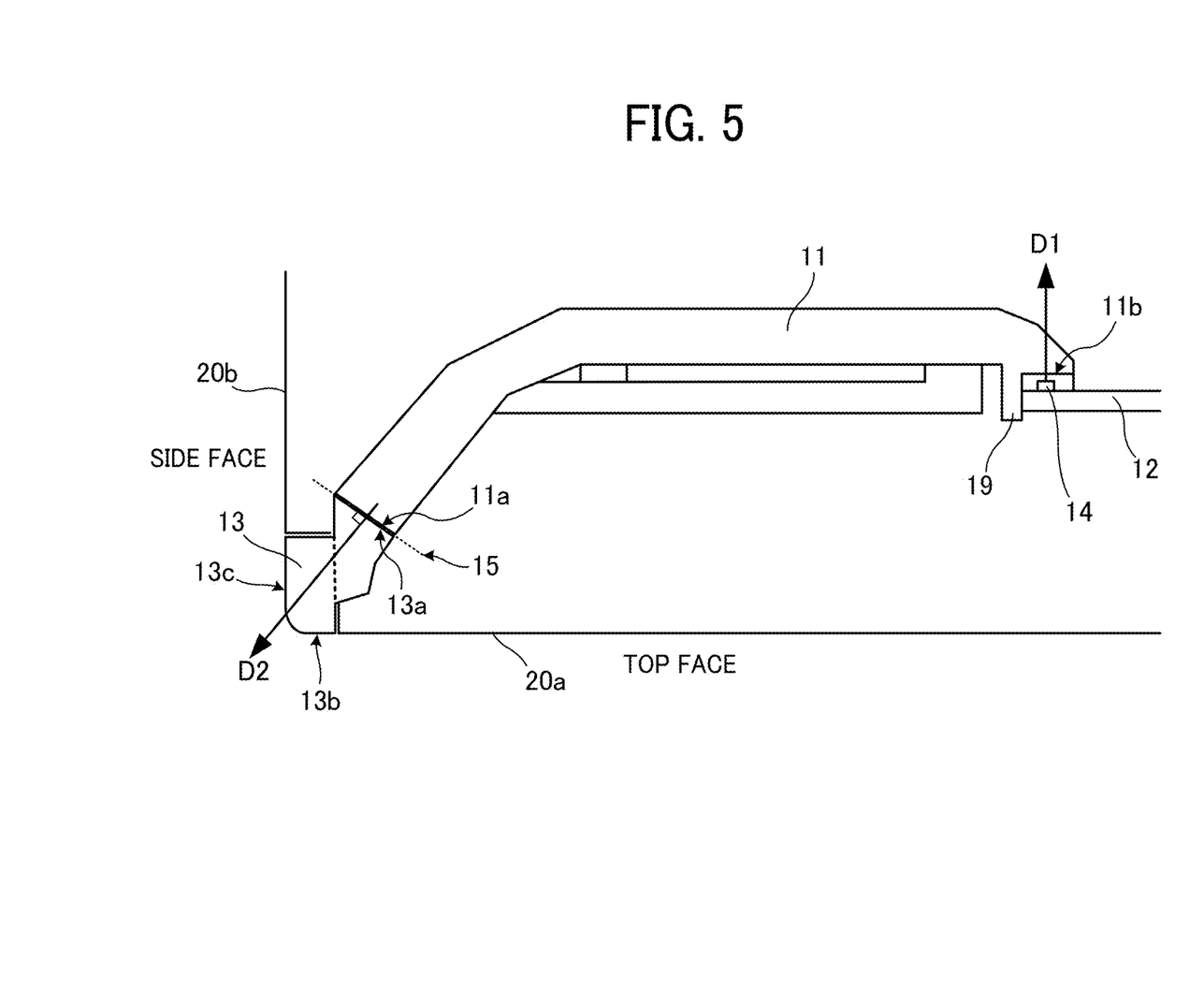
FIG. 5 is a schematic side view of a light source, a light guide, and a lens according to an embodiment of the present disclosure, and illustrates the arrangement of these elements.

FIG. 5 is a schematic side view of the light source 14, the light guide 11, and the lens 13 according to the present embodiment, and illustrates the arrangement of these elements.

Figure 6A:
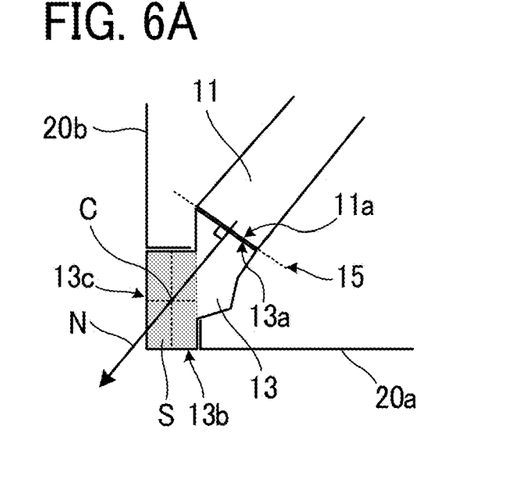
FIG. 6A and FIG. 6B are diagrams each illustrating the arrangement of a light guide and a lens, according to an embodiment of the present disclosure.
Figure 6B:
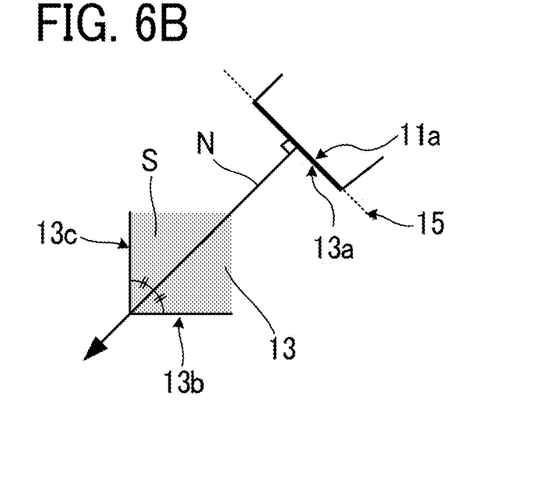

FIG. 6A and FIG. 6B are diagrams each illustrating a portion from the exit plane 11a of the light guide 11 to a photo-sensing surface 13a of the lens 13, according to the present embodiment.

As illustrated in FIG. 6A, in the operation panel 2 according to the present embodiment that serves as a display device, the lens 13 and the light guide 11 are coupled to each other at a coupling surface 15, and the coupling surface 15 is orthogonal to the direction of travel of the light guided by the light guide 11.

The coupling surface 15 according to the present embodiment is a face formed by the photo-sensing surface 13a of the lens 13 and the exit plane 11a of the light guide 11, which face each other.

Due to such a configuration, for example, the normal line N at the center of the exit plane 11a of the light guide 11 facing the lens 13 passes through the center C of the vertical cross section S of the portion of the lens 13 exposed from the housing 20. For example, the center C is a point of intersection of the center line in the vertical direction and the center line in the horizontal direction on the vertical cross section S.

The areas of the top face 13b and the side face 13c of the lens 13 that are exposed from the housing 20 can be changed as desired according to the shape of the opening 22.

In the present embodiment described with reference to FIG. 5, there is no large difference in area between the top face 13b and the side face 13c of the lens 13, and the corner that the top face 13b forms with the side face 13c has an R shape. The R-shaped portion includes a central area in a planar view of the external shape including the top face 13b and the side face 13c of the lens 13 exposed from the housing 20. In the present embodiment described with reference to FIG. 5, the normal line N at the center of the exit plane 11a of the light guide 11 passes through the R-shaped portion.

In the present embodiment in which the shape and area of the top face 13b and the side face 13c of the exposed lens 13 are substantially the same, as illustrated in FIG. 6B, the normal line N to the center of the exit plane 11a of the light guide 11 that faces the lens 13 is a straight line bisecting the angle θ that a top face 13b of the lens 13 exposed from the top face of the housing forms with a side face 13c of the lens 13 exposed from the side face of the housing.

Figure 7A:
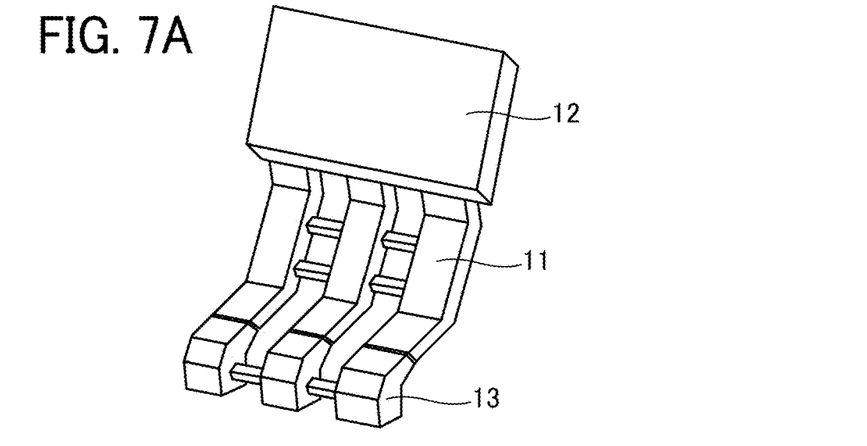
FIG. 7A and FIG. 7B are diagrams each illustrating of an embodiment of the present disclosure in which multiple light guides and multiple lenses are formed as a single integrated unit.
Figure 7B:
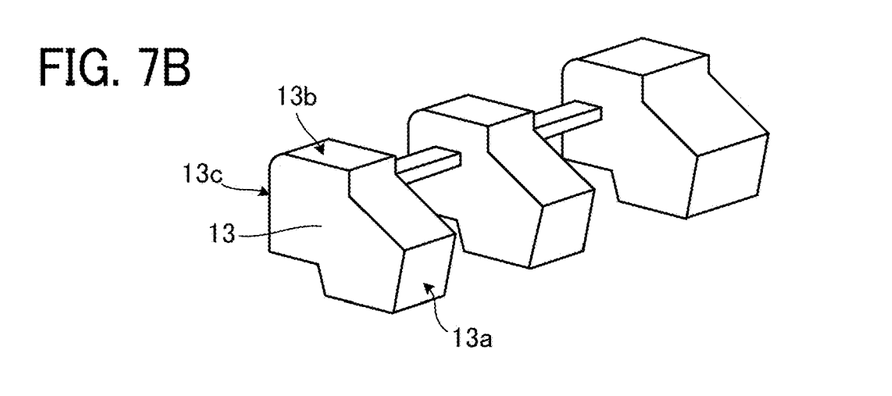

FIG. 7A and FIG. 7B are diagrams each illustrating of an embodiment of the present disclosure in which the multiple light guides 11 and the multiple lenses 13 are formed as a single integrated unit.

FIG. 7A is a schematic top view of the substrate 12, the multiple light guides 11, and the multiple lenses 13, according to the present embodiment.

FIG. 7B is a schematic diagram illustrating the three lenses 13 that are formed as a single integrated unit, according to the present embodiment.

As illustrated in FIG. 7A and FIG. 7B, the display device according to the present embodiment includes a plurality of light sources 14 that correspond to a plurality of display lamps 10, the multiple lenses 13 that correspond to the multiple display lamps 10, and the multiple light guides 11 that correspond to the multiple display lamps 10. It is desired that each pair of one of multiple lenses 13 and one of the multiple light guides 11 adjacent to each other be connected to each other and formed as a single integrated unit.

The multiple lenses 13 and the multiple light guides 11, which are formed as a single integrated unit, are fixed at a predetermined position inside the housing 20 by a holding member.

With the display device according to the present embodiment, the light on the substrate 12, which is emitted from the light source 14, can be guided to the multiple lenses 13 of the display lamp 10, which are arranged at an edge of the housing 20, by the multiple light guides 11. Due to such a configuration, it is not necessary to change the size or arrangement of the substrate 12 depending on the position of the multiple display lamps 10. Moreover, due to such a configuration, it is not necessary to prepare another substrate on which the light source 14 is mounted, and it is not necessary to couple such an additional substrate to the substrate 12 using, for example, a wire harness. As a result, the substrate 12 can be downsized, and the number of components can be reduced, and the reduction in cost can be achieved. By changing the design of the light guide 11, the substrate 12 can be used in common with an operation panel 2 having an operation screen 21 of a different size.

With the display device according to the present embodiment, it is not necessary for the light source 14 to be arranged close to the lens 13. Accordingly, the degree of flexibility in design increases. For example, the substrate 12 can be arranged at a position away from the side face inside the housing 20. Due to such a configuration, the influence from the outside due to, for example, static electricity can be reduced.

With the display device according to the present embodiment, the normal line N to the center of the exit plane 11a of the light guide 11 passes through the center C of the vertical cross section S of the portion of the lens 13 exposed from the housing 20. Accordingly, the light from the light source 14 can evenly be guided to the light-emitting surface of each one of the top face and the side face, and the unevenness in how the light looks can be prevented.

In other words, without upsizing the substrate 12 on which the light source 14 is mounted, a uniform and sufficient radiation intensity of light can be obtained when the display lamp 10 arranged at the corner of the edge of the housing 20 is turned on.

FIG. 8A, FIG. 8B, FIG. 8C, FIG. 8D, and FIG. 8E are diagrams each illustrating the surface profile or surface shape of the photo-sensing surface 13a of the lens 13, according to the present embodiment.

Figure 8A:
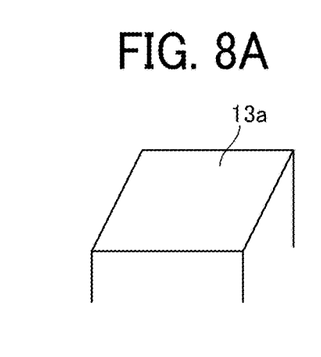
FIG. 8A, FIG. 8B, FIG. 8C, FIG. 8D, and FIG. 8E are diagrams each illustrating the surface profile or surface shape of the photo-sensing surface of a lens, according to an embodiment of the present disclosure.

FIG. 8A illustrates the photo-sensing surface 13a of the lens 13 when the photo-sensing surface is not-yet processed and is a smooth surface.

In the present embodiment described with reference to FIG. 8B, FIG. 8C, FIG. 8D, and FIG. 8E, the photo-sensing surface 13a of the lens 13 that faces the exit plane 11a of the light guide 11 is grained or processed to have bumps and dips.

Figure 8B:
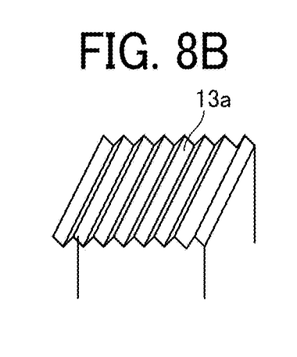
Figure 8C:
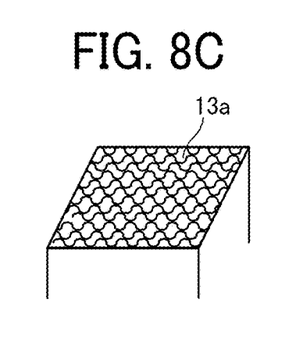
Figure 8D:
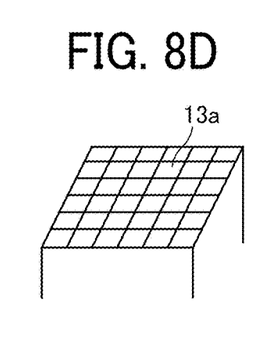
Figure 8E:
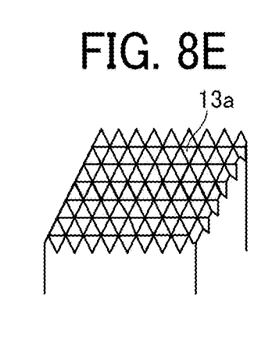

In the present embodiment described with reference to FIG. 8B. FIG. 8C, FIG. 8D, and FIG. 8E, microstructure is formed on the photo-sensing surface 13a of the lens 13. Due to such a configuration, the light can be dispersed into the lens 13, and the radiation intensity of light on the light-emitting surface can be made even and uniform.

How the processing is to be performed is not limited to the embodiment described above with reference to FIG. 8B, FIG. 8C, FIG. 8D, and FIG. 8E, and any desired processing may be selected and adopted.

It is desired that the light guide 11 be made of, for example, a colorless and translucent resin material. By adopting such a material as above, the light guide function can be achieved at low cost. The light guide 11 according to the present embodiment can be mass-produced by injection molding.

It is desired that the lens 13 be made of a colored transparent resin material. For example, the lens 13 may be colored to the same or equivalent color as that of the housing 20 so as not to stand out at when the light source is turned on to emit light. Alternatively, any desired color such as milk white or smoky color may be selected.

When the housing 20 according to the present embodiment is in black or in a dark or strong color close to black, it is desired that the lens 13 be made of, for example, a transparent resin material. Due to such a configuration, an appearance unified to the color same as that of the housing 20 can be achieved under non-emitting conditions.

In a similar manner to the light guide 11, the lens 13 may be made of a low-cost mass-produced member.

With the display device according to the present embodiment, even when a lens that does not stand out under non-emitting conditions is adopted, the light from the light source 14 can be distributed over the entire lens in a turned-on state. Accordingly, the light emission can be visually recognized at any angle.

As illustrated in FIG. 5, in the display device according to the present embodiment, the light source 14 is oriented such that its light-emitting surface does not face the photo-sensing surface 13a and the light-emitting surface of the lens 13 exposed from the housing 20. In FIG. 5, D1 indicates the direction in which the light source 14 emits the light, and D2 indicates the direction in which the light is emitted through the lens 13.

In other words, the light emitted from the light source 14 does not directly enter the lens 13, but enters the lens 13 as guided by the light guide 11.

Due to such a configuration as described above, an adjacent one of the multiple display lamps 10 does not emit undesired light due to escaping light, and multiple display lamps 10 can emit light independently of each other.

As illustrated in FIG. 7A, each one of the multiple light guides 11 and adjacent members are connected to each other and formed as a single integrated unit. The portion that is not connected or coupled is a cavity, but it is desired that the light from adjacent one of the multiple light guide 11 be shielded and not go beyond such a cavity.

Figure 9:
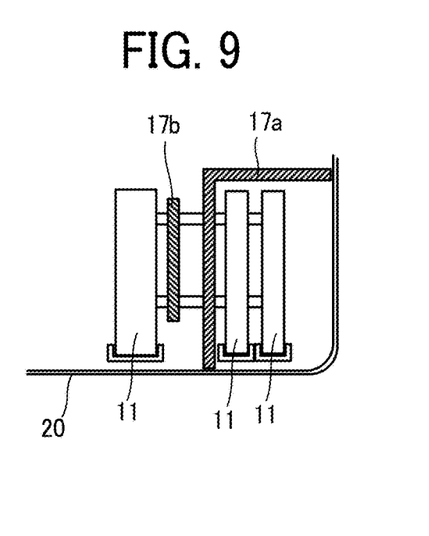
FIG. 9 is a schematic diagram illustrating the arrangement of a light-shielding member according to an embodiment of the present disclosure.

FIG. 9 is a schematic diagram illustrating an embodiment of the present disclosure in which a light-shielding member 17a and a light-shielding member 17b are arranged.

In the display device according to the present embodiment including the multiple light sources 14, the multiple light guides 11, and the multiple lenses 13, it is desired that the light-shielding member 17a and the light-shielding member 17b be arranged between an adjacent pair of the multiple light guides 11. By arranging the light-shielding member 17a and the light-shielding member 17b, the color transfer between an adjacent pair of the multiple light guides 11 can be prevented from occurring, and only a desired one of the multiple display lamps 10 can be turned on to emit light.

In the present embodiment described with reference to FIG. 9, a light-shielding member 17a that serves as a partition by ribbing is arranged so as to cover or surround the multiple light guides 11 in a region where two of the three light guides 11 on the right side of FIG. 9 are arranged. Although the light-shielding member 17a is arranged so as to cover or surround the pair of light guides 11 in FIG. 9, the light-shielding member 17a may be arranged between the pair of light guides 11 so as to shield the light that could interfere with each other between the pair of light guides 11. In the cavity on the right of one of the multiple light guides 11 on the left in FIG. 9, a light-shielding member 17b that serves as a partition made of sheet metal is arranged.

For example, the material, the shape, and the installation position of the light-shielding member 17a and the light-shielding member 17b are not limited to the embodiment described with reference to FIG. 9. For example, any desired material, the shape, and the installation position may be selected and adopted for the light-shielding member 17a and the light-shielding member 17b according to the present embodiment.

As illustrated in FIG. 5, in the display device according to the present embodiment, the light source 14 is arranged near an end of the substrate 12. The light guide 11 has a photo-sensing surface 11b, and has a convex portion 19 extending from the photo-sensing surface 11b. Such a convex portion 19 contacts the side face of the end of the substrate 12.

The light guide 11 is arranged such that the photo-sensing surface 11b is arranged above the light sources 14 in the light exit direction D1, and the light guide 11 is supported on a side of the substrate 12 by the convex portion 19. Due to such a configuration, the saccadic movement or rattling can be prevented, and the light emitted from the light source 14 does not escape therefrom.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A display device comprising:
    an operation screen attached to an apparatus and configured to accept instructions for the apparatus;
    a plurality of display lamps each including a light emitter and configured to provide notification of a state of the apparatus;
    a light source configured to emit light;
    a substrate on which the light source is mounted;
    a lens that makes up the light emitter of each one of the plurality of display lamps;
    a light guide configured to guide the light emitted from the light source to the lens; and
    a housing that covers the substrate, the housing having an opening at which the lens is exposed, at an area including a corner formed by an edge of a top face on which the operation screen is disposed and a side face,
    the lens and the light guide being coupled to each other at a coupling surface,
    the coupling surface being orthogonal to a direction of travel of the light guided by the light guide.

2. The display device according to claim 1, further comprising:
    a plurality of light sources including the light source, the plurality of light sources corresponding to the plurality of display lamps;
    a plurality of lenses including the lens, the plurality of lenses corresponding to the plurality of display lamps; and
    a plurality of light guides including the light guide, the plurality of light guides corresponding to the plurality of display lamps,
    wherein each pair of one of the plurality of lenses and one of the plurality of light guides adjacent to each other are connected to each other and formed as a single integrated unit.

3. The display device according to claim 1,
    wherein the light guide has an exit plane through which the light exits, wherein the lens has a photo-sensing surface facing the exit plane of the light guide, and wherein the photo-sensing surface is grained or processed to have bumps and dips.

4. The display device according to claim 1,
    wherein the light guide is made of a colorless and translucent resin material, and
    wherein the lens is made of a colored transparent resin material.

5. The display device according to claim 1,
    wherein the light source has a light-emitting surface, wherein the lens has a photo-sensing surface and light-emitting surface, and
    wherein the light-emitting surface of the light source does not face the photo-sensing surface and the light-emitting surface of the lens when the light source is oriented.

6. The display device according to claim 1, further comprising:
  a plurality of light guides including the light guide; and
  a light-shielding member disposed between a pair of the plurality of light guides adjacent to each other.

7. The display device according to claim 1,
  wherein the light source is disposed close to an end of the substrate,
  wherein the light guide has a photo-sensing surface and a convex portion extending from the photo-sensing surface, and
  wherein the convex portion contacts a side face of the end of the substrate.

8. The display device according to claim 1,
  wherein the apparatus is an image forming apparatus.

9. An image forming apparatus comprising
  the display device according to claim 1.

\* \* \* \* \*